J. D. SAMPLEY.
COMBINED UTENSIL HANDLE AND LID LIFTER.
APPLICATION FILED MAY 26, 1911.
1,044,253.
Patented Nov. 12, 1912.
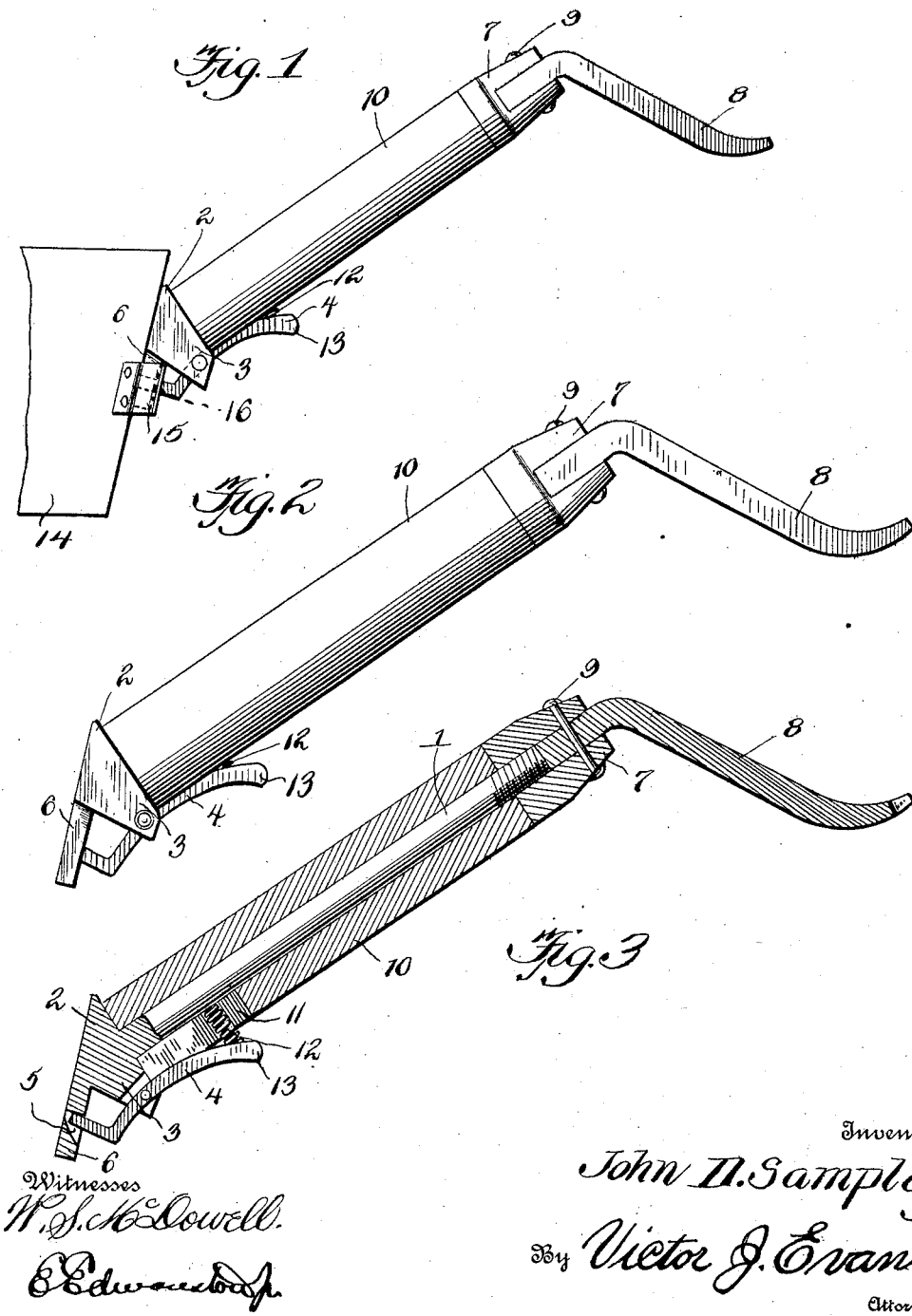

UNITED STATES PATENT OFFICE.

JOHN D. SAMPLEY, OF BUCHANAN, NEW MEXICO.

COMBINED UTENSIL-HANDLE AND LID-LIFTER.

1,044,253.  Specification of Letters Patent.  Patented Nov. 12, 1912.

Application filed May 26, 1911. Serial No. 629,648.

*To all whom it may concern:*

Be it known that I, JOHN D. SAMPLEY, a citizen of the United States, residing at Buchanan, in the county of Guadalupe and State of New Mexico, have invented new and useful Improvements in Combined Utensil-Handles and Lid-Lifters, of which the following is a specification.

This invention relates to combined utensil handles and lid lifters and the object of the invention is the provision of a unitary device of which character by which all types of cooking utensils may be readily handled and whereby stove lids may be readily lifted.

A further object of this invention is the provision of a detachable handle of this character which may be readily applied to and disconnected from kitchen utensils of all characters and which is provided with a lifting foot which may be inserted in the stove lids so that they may be removed when necessary.

Further objects of the invention will appear as the following specific description is read in connection with the accompanying drawing, which forms a part of this application, and in which:—

Figure 1 is a side elevation of the device applied to a receptacle. Fig. 2 is a detailed elevation of the device removed from the receptacle. Fig. 3 is a longitudinal sectional view.

Referring more particularly to the drawing, 1 represents a shank which has secured to its forward end a head 2 having laterally projecting ears 3 in which is pivoted a locking dog 4 whose outer end is bent so as to enter an aperture 5 in the diagonally arranged foot 6. The opposite end of the shank has secured thereto a head 7 which is bifurcated to receive the end of a lid-lifting foot 8. The foot is secured in the head 7 by means of a bolt 9 which passes therethrough. Surrounding the shank, between the heads 2 and 7, is a handle 10 which is slotted at 11 to permit the operation of the locking dog and to receive a spiral spring 12 which is bridged between the shank 1 and the handle 13 by which the dog is operated.

The diagonal foot 6 is adapted to engage between the side of the receptacle 14 and a substantially U-shaped bracket 15 secured to the receptacle, and the locking dog is adapted to enter an aperture 16 in the bracket which, when the foot is in position, will register with the aperture in the foot. By depressing the handle end of the locking dog, the engaging foot is raised out of the aperture in the diagonal foot and the latter may be inserted in the U-shaped bracket and locked in such position by the dog. The diagonal foot may be released from the receptacle in a similar manner.

By using a handle of this character it will readily be seen that the cooking utensils may be placed upon the stove and the handle removed so as not to receive the heat from the fire and the cook is therefore always provided with a cool handle to remove the utensils from the stove when necessary.

The handle 10 is preferably made of any suitable heat insulating material and the shank and heads are preferably cast as a unit.

Having thus described the invention, what I claim as new is:—

In combination, a rod having a threaded upper end and a block integral with its lower end, said block having a depending lug and an inclined forward face and a recess in its under side, a tubular insulating handle disposed on said rod and bearing at its lower end against said block and provided with a recess registering with the recess of the block, said depending lug being provided with an opening, a latch lever pivoted in the recess of said block and having a curved upper end movable in the recess of the tubular insulating handle, and an angular lower end engaging the opening in the depending lug, a spring bearing against the curved upper end of said latch lever and against the rod to hold said lever in a normal locking position and a cap threaded on the rod and holding said tubular handle snugly in place.

In testimony whereof I affix my signature in presence of two witnesses.

JOHN D. SAMPLEY.

Witnesses:
J. J. HARRINGTON,
EUCLID D. MILLER.

---

Copies of this patent may be obtained for five cents each, by addressing the "Commissioner of Patents, Washington, D. C."